June 16, 1936.      L. R. HEIM      2,044,168
ROLLER BEARING CONSTRUCTION
Filed Jan. 24, 1931
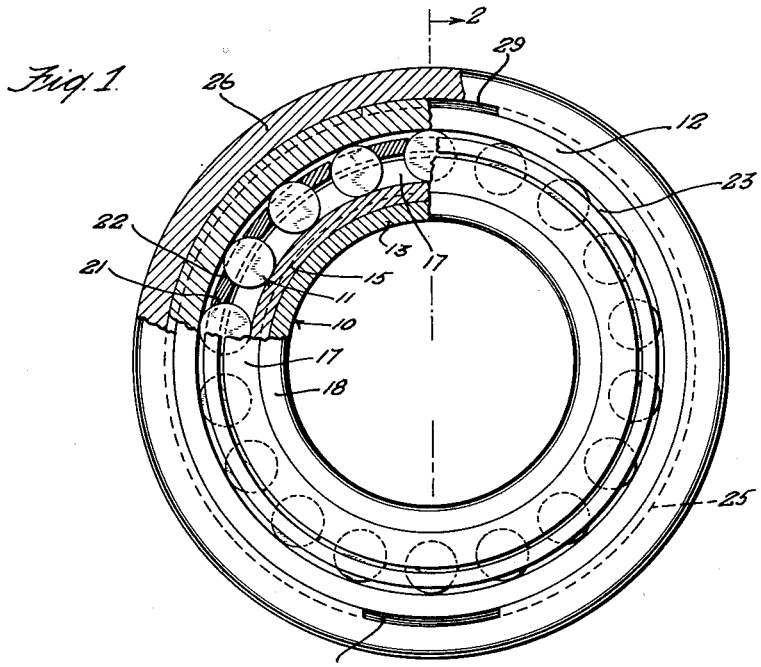
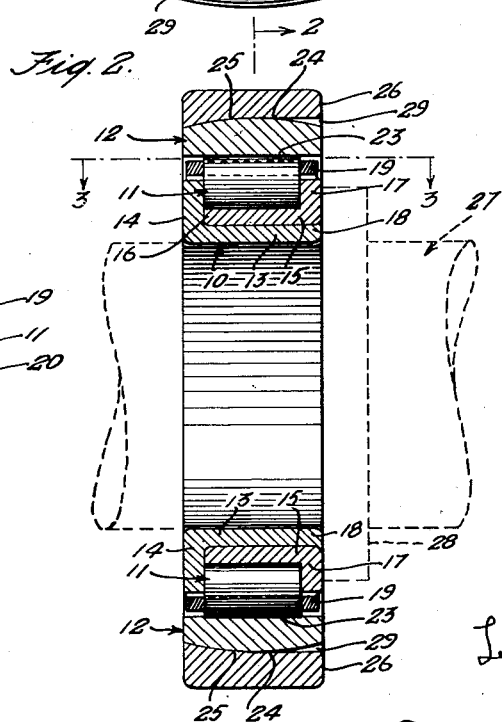
Lewis R. Heim
INVENTOR
BY Janney, Blair & Curtis
ATTORNEYS

UNITED STATES PATENT OFFICE 2,044,168

ROLLER BEARING CONSTRUCTION

Lewis R. Heim, Mount Dora, Fla.

Application January 24, 1931, Serial No. 510,862

17 Claims. (Cl. 308—212)

This invention relates to rolling bearing construction and to an art of making the same.

One of the objects of this invention is to provide a practical device of the above character of simple and thoroughly durable construction. Another object is to provide a device of the above character which will dependably retain rolling members with a minimum of friction. Another object is to provide a device of the above character which will be well adapted for ready assembly of its parts and its mounting while affording a minimum risk of creating a defective bearing through poor workmanship or careless assembly. Another object is to provide a device of the above character which may be constructed by means of cheap material and labor. Another object is to provide a method of constructing bearings which will be cheap, simple, practical and which m. y be readily practiced under various conditions. Another object is to provide a method of the above character requiring a minimum amount of labor and mechanical facilities, and which may be carried on with rapidity without sacrificing a high standard of structural efficiency. Other objects will be in part obvious and in part pointed out hereinafter.

This invention accordingly consists in the combinations of elements, features of construction, arrangements of parts, and in the steps and relation of steps as will be exemplified in the art and construction to be hereinafter described, and the scope of the application of which will be indicated in the appended claims.

In the accompanying drawing in which certain steps of my method are generally indicated, and in which is shown one or more of the various possible embodiments of the mechanical features of my invention, Figure 1 is an end elevation of a bearing, certain of the parts being in section, Figure 2 is a cross section of the bearing taken along the line 2—2 of Figure 1, Figure 3 is a cross section of the bearing taken along the line 3—3 of Figure 2.

Similar references and characters refer to similar parts throughout the several views of the drawing.

Referring now to Figures 1 and 2 in detail, there is shown a bearing, preferably of the roller type, having an inner race generally indicated at 10, rolls generally indicated at 11, and an outer race generally indicated at 12.

At one end of a cylindrical shell 13 is an outwardly extending flange or projection 14. Flange 14 is substantially at right angles to the periphery of shell 13. A shell 15 whose inner diameter is slightly less than the periphery of shell 13 forms a close fit therewith and rests with one end 16 thereof in substantial engagement with the inner face of flange 14. Extending outwardly from the opposite end of shell 15 is a flange 17. The diameter of the periphery of flange 17 with respect to the bearing is substantially similar to the diameter of flange 14. More specifically the length of flange 14 is preferably equal to the length of flange 17 plus the thickness of shell 15. A lip 18 on shell 13 extends about the edge of shell 15 so that shells 13 and 15 are interlocked to form a unit. This interlocking lip provides for a more durable construction suitable for many conditions met with in practice, although a thoroughly durable bearing may be formed without this lip.

Thus shells 13 and 15 coact to form a thoroughly practical inner race for the rolls 11. The periphery of shell 15 forms the floor of the race and the opposing flanges 14 and 17 the walls therefor.

A cage 19, preferably having a larger diameter than the peripheries of flanges 14 and 17, extends about race 10. As more clearly shown in Figure 3, cage 19 has slotted pockets 20 in its surface through which rolls 11 extend. These pockets are preferably of a smaller width than the diameter of the rolls. Thus only a portion of the rolls may extend therethrough. The opposite walls 21 and 22 of pockets 20 are beveled so that the width of the pockets on the inner surface of cage 19 is greater than the width of the pockets on the outer surface thereof. Thus walls 21 and 22 are in registry with and substantially correspond to the surfaces of the rolls 11 extending through pockets 20 and the diameter of cage 19 is such that these walls loosely fit the rolls.

The inner race together with rolls 11 and cage 19 forms a complete bearing unit upon assembly. The rolls are retained against lateral movement by flanges 14 and 17 forming the walls of the race, and cage 19 prevents any radial displacement of the rolls before the installation of the bearing and is itself held against endwise movement by the rolls. Furthermore, cage 19 also performs the function of a separator or spacer preventing any unequal distribution of the rolls about the race. In this manner a cheap and inexpensive bearing is provided without sacrificing the advantages of a simple and efficient construction. This bearing may be assembled completely at its place of manufacture and then shipped to the user as a unit without the risk of losing parts in transportation. Further still, this allows for a complete assembly by experts who are skilled in the art, thus precluding all possibility of injury and poor operation through inefficient assembly.

The outer race 12 may take any desired form but preferably presents a flat cylindrical surface 23 to the rolls 11. Race 23 may have inwardly extending flanges to form walls therefor, this being advantageous under certain conditions met with in practice. The outer surface 24 of race 12 in this preferred construction is substantially spherical in shape. This surface corresponds to and fits a spherical concave surface 25 of a member generally indicated at 26. Surfaces 24 and 25 of race 12 and member 26 are in substantial registry, their radial dimensions being similar.

Two oppositely disposed grooves 29 are provided on the inner surface of member 26. The circumferential length of these grooves is preferably equal to the width of outer race 12. The diameter of these grooves at the outer end of the bearing is equal to the maximum outer diameter of race 12. Thus upon assembly of the bearing unit, race 12 may be inserted in member 26 so that surfaces 25 and 24 are in substantial registry by placing race 12 in grooves 29 in member 26 and so that the respective axes of these two members are at right angles to each other. Race 12 may now be forced under member 26 through grooves 29 for the diameter of the grooves 29 is equal to the greatest diameter of race 12, and, subsequently, upon turning race 12 so that it is in substantial alignment with member 26, race 12 and member 26 are in assembled and operative condition with respect to each other.

Referring to the operation of this bearing the inner race 10 is mounted in any convenient manner on a shaft generally indicated at 27 and may rest against a shoulder 28. If the axis of bearing 12 is out of alignment with shaft 27 when installed or through deterioration of working parts is thrown out of alignment, race 12 swings about the inner surface 25 of member 26 to compensate for this axial misalignment. More specifically the spherical construction of the engaging surfaces 24 and 25 respectively form a universal joint for adjusting the position of the bearing. In this manner, an axial misalignment, such as that described above, which under ordinary circumstances might serve to jam the rolls by forcing one of the flanges of the inner race against the ends of the rolls, or by forcing the respective floors of the races against the rolls to create an extremely injurious friction and possible inoperativeness is effectively and automatically corrected so that the bearing may operate dependably at all times.

A convenient method for forming this bearing is to cut the flanged shell 13 from steel tubing as by automatics and form the flanged shell 15 in a similar manner from a tube whose inner diameter is slightly smaller than the periphery of flanged shell 13 when completed. The cage 19 may be formed by casting a suitable metal and subsequently machining the casting or by die-casting. The rolls 11 are then disposed about the inner surface of cage 19 so that portions thereof extend through the respective pockets. The flanged cylindrical shell 15 is then placed within cage 19 to engage the inner surfaces of the rolls and so that its flange 17 extends over one end of the rolls. Next shell 13 is forced over the inner surface of shell 15 so that its flange extends over a portion of the opposite end of the rolls from flange 17. A lip 18 may be formed on the periphery of shell 13 to interlock with shell 15 by crimping with suitable dies, or this may be formed merely by the degree of endwise pressure applied thereto. In this manner a complete bearing unit is formed and as so assembled, it may be shipped to the user. This provides a simple and easy method calling for inexpensive and readily attainable raw materials.

The outer race 12 may be formed from a steel tube on an automatic by employing means for machining its spherical outer surface 25. In substantially a similar manner, member 26 may be formed and thereafter race 12 may be placed within member 26 through grooves 29 as described above. The two units, consisting of the inner race, rolls and cage separator, and the outer race together with member 26, may now be shipped to the user. The bearing may be installed by mounting it on a suitable shaft such as that indicated at 27, and the outer member 26 with race 12 may be secured in a machine or hanger in any suitable manner. Next the shaft upon which the inner race together with the rolls and cage separator have been mounted may now be passed through the outer race so that the rolls come into substantial registry therewith. This method of assembly and construction provides an economical and efficient bearing which may be constructed and installed with a minimum of risk of injury thereto, and it will be seen that slight endwise movement or vibration of the shaft brings no endwise thrust on the rolls, due to the wider finished surface 23 of the outer race 12.

It will thus be seen that I have provided a thoroughly practical and efficient construction and method of assembly for a bearing in which the several objects hereinabove set forth together with many practical advantages have been successfully accomplished.

As many possible embodiments may be made in this invention, and as many steps may be made in the embodiments above set forth or in the steps hereinbefore set forth, it is to be understood that all matter hereinabove described or set forth in the accompanying drawing is to be interpreted as illustrative and not in a limited sense.

I claim:

1. In a bearing construction, in combination, a cylindrical shell having an annular flange formed on one side thereof, a second cylindrical shell having an annular flange on one side thereof, said shells being telescopically fitted one within the other so that the edge portion of one shell overlaps the adjacent edge of the other shell to form an interlock therebetween, a plurality of rolling members resting upon one of said shells disposed between both of said flanges and having diameters greater than the shortest of said flanges, and means associated with said rolling members for retaining them in said position against radial displacement.

2. In a bearing construction, in combination, a cylindrical shell having an annular flange formed on one side thereof, a second cylindrical shell having an annular flange on one side thereof, said shells being telescopically fitted one within the other so that an edge of one shell lies flush against the inner surface of the annular flange of the other shell and an edge portion of one shell overlaps the adjacent edge portion of the other shell to form an interlock therebetween, a plurality of rolling members resting upon one of said shells disposed between both of said flanges and having diameters greater than the shortest of said flanges, and a cage member fitted about said shells and said rolling members to retain said rolling members against radial displacement.

3. In a bearing construction, in combination, a cylindrical shell having a right angle annular flange formed on one side thereof, a second cylindrical shell having an annular flange formed on one side thereof and fitted tightly over the outer surface of said first cylindrical shell so that its edge lies flush against the inner surface of said first-mentioned flange, the free edge portion of said second shell overlapping one edge of said first shell to form an interlock therebetween, the radial length of said first-mentioned flange being substantially equal to the radial length of said second-mentioned flange plus the thickness of said second-mentioned shell, said shells forming a raceway, a plurality of rolling members disposed within said raceway between said flanges, and a cage extending about said rolling members and said raceway to hold said rolling members against radial displacement.

4. In a bearing construction, in combination, a cylindrical shell having a right angle annular flange formed on one side thereof, a second cylindrical shell having an annular flange formed on one side thereof and fitted tightly over the outer surface of said first cylindrical shell so that its edge lies flush against the inner surface of said first-mentioned flange, the radial length of said first-mentioned flange being substantially equal to the radial length of said second-mentioned flange plus the thickness of said second-mentioned shell, said shells forming a raceway and being formed and related to retain each other in said assembled relation, a plurality of rolling members disposed within said raceway between said flanges, said flanges extending substantially to the axes of said rolling members, and a cage in registry with said raceway and spaced therefrom and having openings formed therein, the longitudinal sides of said openings being beveled, and portions of said rolling members extending through said openings so that said longitudinal sides are in substantial alinement with the periphery of said rolling members, the diameter of said rolling members being greater than the length of said openings in a direction circumferential to the raceway.

5. In bearing construction, in combination, a cylindrical shell having a right angle annular flange formed on one side thereof, a second cylindrical shell having an annular flange formed on one side thereof and telescoped with said first-mentioned cylindrical shell, the edge portion of one shell overlapping the adjacent edge portion of the other shell to form an interlock therebetween, said shells comprising a race, a plurality of rolls disposed about said race between said flanges, and a cage in registry with said race and having openings formed therein through which said rolls extend, the longitudinal sides of said openings being beveled and in substantial alinement with the periphery of said rolls.

6. In bearing construction, in combination, a race including a pair of telescopically interfitted cylindrical shells each having an annular flange formed on one side thereof extending in the same direction to form the opposite walls of said race, the edge portion of one of said shells overlapping the corresponding edge of the other of said shells to form an interlock therebetween, a plurality of rolling members disposed within said race, a cylindrical member forming an outer race for said rolling members, the outer surface of said cylindrical member being substantially spherical, and a part whose inner surface substantially corresponds with the outer surface of said cylindrical member fitted about said cylindrical member.

7. In bearing construction, in combination, a race including a pair of telescopically interfitted cylindrical shells each having an annular flange formed on one side thereof extending in the same direction to form the opposite walls of said race, the edge portion of one of said shells overlapping the corresponding edge of the other of said shells to form an interlock therebetween, a plurality of rolling members disposed within said race, a cage member extending about said rolling members and having slots through which said rolling members extend, a cylindrical member forming an outer race for said rolling members, the outer surface of said cylindrical member being substantially spherical, and a part whose inner surface substantially corresponds with the outer surface of said cylindrical member fitted about said cylindrical member.

8. In a bearing construction, in combination, a sheet metal cylindrical shell having an annular flange formed on one side thereof, a second sheet metal cylindrical shell having an annular flange on one side thereof, said shells being telescopically fitted one within the other so that the edge portion of one shell overlaps the adjacent edge of the other shell to form an interlock therebetween, a plurality of rolling members resting upon one of said shells disposed between both of said flanges and having diameters greater than the shortest of said flanges, and means associated with said rolling members for retaining them in said position against radial displacement.

9. In a bearing construction, in combination, a cylindrical shell provided with an integral flange, a second cylindrical shell telescopically fitted within said first shell and provided with an integral flange substantially facing the flange of said first shell, the body portion of said second shell resting against the inner surface of the flange of said first shell and the body portion of said first shell extending out to the outer surface of the flange of said second shell, means forming an interlock between said shells to prevent separation thereof, a set of rolls mounted upon said shells and between said flanges, and means comprising a raceway coacting with said rolls and adapted to support the bearing and permit relative movement thereof other than in its direction of rotation.

10. In a bearing construction comprising, in combination, a race comprising a pair of cylindrical shells, telescopically related flange means associated with said shells and extending radially therefrom, means forming an interlock between said shells, a plurality of rolling members revolvably associated with said race, said rolling members being retained against axial displacement by said flange means when in assembled relation therewith, and means associated with said rolling members for retaining them against radial displacement, said last-mentioned means comprising a second race.

11. In a bearing construction comprising, in combination, a cylindrical shell having an annular flange formed on one side thereof, a second cylindrical shell having an annular flange on one side thereof, said shells being telescopically fitted one within the other so that the edge of one abuts the flange of the other and so that an edge portion of one shell overlaps the adjacent edge portion of the other shell to form an interlock therebetween, anti-friction means disposed about one of said shells between said flanges, and means adapted to prevent radial displacement of said rolling means.

12. In a bearing construction, in combination, a cylindrical shell having an annular flange formed on one side thereof, a second cylindrical shell having an annular flange on one side thereof, said shells being telescopically fitted one within the other so that the edge portion of one shell overlaps the adjacent edge of the other shell to form an interlock therebetween, a plurality of rolling members disposed about one of said shells between both of said flanges, and means comprising a race coacting with said rolling members and adapted to support the bearing and permit relative movement thereof other than in its direction of rotation.

13. In a bearing construction, in combination, a cylindrical shell having an annular flange formed on one side thereof, a second cylindrical shell having an annular flange formed on one side thereof, said shells being telescopically fitted one within the other, means for forming an interlock between said shells to prevent separation thereof, a plurality of rolling members resting upon one of said shells and disposed between both of said flanges, said shells forming an inner race, a cylindrical member forming an outer race for said rolling members, the outer surface of said cylindrical member being substantially spherical and a part whose inner surface substantially corresponds with the outer surface of said cylindrical member fitted about said cylindrical member.

14. In a bearing construction, in combination, a cylindrical shell provided with a flange, a second cylindrical shell telescopically fitted within said first shell and provided with a flange substantially facing the flange of said first shell, the body portion of said second shell resting against the inner surface of the flange of said first shell and the body portion of said first shell extending out to the outer surface of the flange of said second shell, a set of rolls mounted upon said shells and between said flanges, and means comprising a raceway coacting with said rolls and adapted to support the bearing, said raceway means including a cylindrical member the inner surface of which is substantially flat and the outer surface of which is substantially spherical, said raceway means also including a cylindrical member the inner surface of which substantially conforms to the outer surface of said first-mentioned cylindrical member and the outer surface of which is substantially concentric with the inner surface of said first-mentioned cylindrical member whereby relative movement of the bearing is permitted in a direction other than its direction of rotation.

15. In a bearing construction, in combination, means forming an inner race including telescopically fitted shells, said shells having radially extending flanges, a plurality of anti-friction members disposed about said race, and an outer race disposed about said anti-friction members, said outer race including a pair of cylindrical members in telescopic relationship, the adjoining surfaces of said cylindrical members being substantially spherical to permit relative movement of the bearing other than in its direction of rotation, said cylindrical members being of substantially the same width as said inner race.

16. In a bearing construction, in combination, a sheet metal cylindrical shell having an annular flange formed on one side thereof, a second sheet metal cylindrical shell having an annular flange on one side thereof, said shells being telescopically fitted one within the other so that the edge portion of one shell overlaps the adjacent edge of the other shell to form an interlock therebetween, a plurality of rolling members disposed upon one of said shells between both of said flanges, both of said shells comprising an inner race, and means comprising an outer race coacting with said rolling members and adapted to support the bearing and permit relative movement thereof other than in its direction of rotation.

17. In a bearing construction, in combination, an inner race comprising a pair of telescopically interfitted sheet metal cylindrical shells each having an annular flange formed on one side thereof and extending outwardly therefrom, the axial length of the inner shell being greater than the axial length of the outer shell by the thickness of its flange whereby the unflanged edge of the outer shell abuts the flange of the inner shell and the unflanged edge of the inner shell lies in the plane of the exterior side of the flange of the outer shell, a plurality of rolls disposed about said race, means for retaining said rolls about said race against radial displacement, and an outer race disposed about said rolls, said outer race comprising a pair of cylindrical members the width of which is substantially the same as the width of said inner race, the inner surface of said inner cylindrical member being concentric with the outer surface of the outer cylindrical member and the outer surface of the inner cylindrical member being curved in substantial conformity with the inner surface of the outer cylindrical member to permit relative movement of the bearing other than in its direction of rotation.

LEWIS R. HEIM.